JEWETT & BOWEN.
Hay Loader.
No. 51,947. Patented Jan'y 9, 1866.
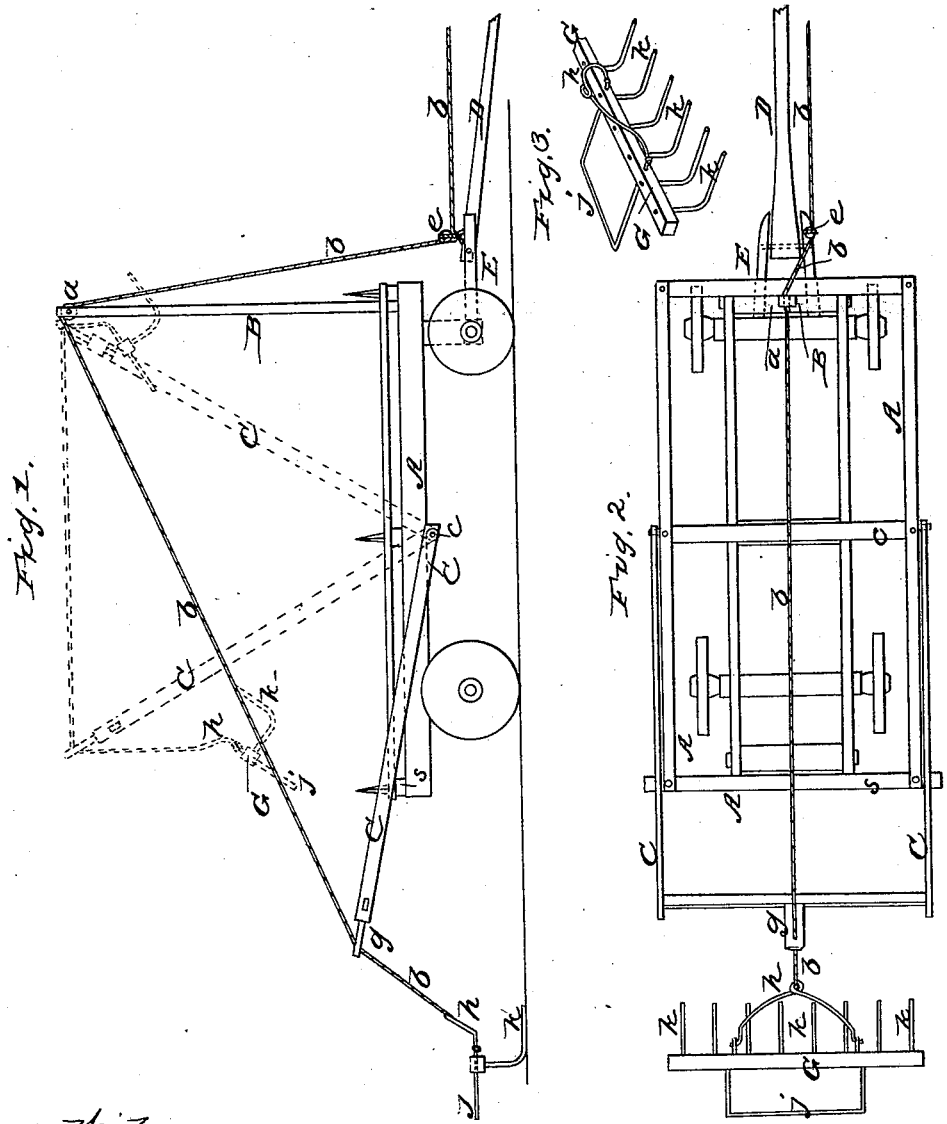

UNITED STATES PATENT OFFICE.

DE WITT C. JEWETT, OF SAND SPRING, AND ASA C. BOWEN, OF BOWEN'S PRAIRIE, IOWA.

IMPROVEMENT IN HAY-LOADERS.

Specification forming part of Letters Patent No. 51,947, dated January 9, 1866.

*To all whom it may concern:*

Be it known that we, DE WITT C. JEWETT, of Sand Spring, in the county of Delaware and State of Iowa, and ASA C. BOWEN, of Bowen's Prairie, Jones' county, State of Iowa, have invented a new and Improved Hay-Loader; and we do hereby declare that the following is a full, clear, and exact description thereof, reference being had to the accompanying drawings, making a part of this specification, in which—

Figure 1 is an elevation of a hay-wagon having our invention applied to it. Fig. 2 is a plan view of the same. Fig. 3 is a perspective view of a rake which is employed in the operation of gathering and loading hay upon wagons.

Similar letters of reference indicate corresponding parts in the three figures.

The object of our invention is to load wagons with hay in the field, and to employ the power of a horse for this purpose.

To this end our invention consists in a frame which is pivoted to the sides of a wagon and adapted to swing from the front to the rear ends thereof, and to discharge the load of hay at any desired point upon the wagon, said frame being so applied that it will serve as a support for a rake or gatherer during the act of collecting a load, and then serve as a means for elevating the load over the wagon, or it will also serve as a means for loading a wagon from stacks when a fork is used, as will be hereinafter described.

To enable others skilled in the art to understand our invention, we will describe its construction and operation.

In the accompanying drawings, A represents a wagon or rack which is adapted for receiving and transporting hay.

B is a standard, which is erected on the front part of the wagon-frame and which is secured rigidly thereto in a vertical position. To the upper end of this standard a pulley, *a*, is suitably applied to receive over it a rope, *b*, which is used for elevating hay upon the wagon, as will be hereinafter described.

At an intermediate point between the front and rear ends of the wagon-frame and pivoted to the ends of a fixed cross-beam, *c*, are two beams which are connected together at their upper ends by a cross-bar, as shown in Fig. 2. This constitutes a frame, C, which can be swung from the front to the rear ends of the wagon-frame, as shown in Fig. 1. The frame C should be of sufficient height or length to allow the wagon to be properly loaded without interfering with its swinging movements.

In front of the wagon-frame, and attached to the draft-pole D or the hounds E, is a pulley-block, *e*, which is intended for receiving the rope *b* through it to allow the horse to draw from this point during the act of elevating a load of hay upon the wagon. The rope *b* passes from pulley *e* over pulley *a*, and thence through a projecting arm, *g*, which is secured to the middle of the length of the cross-beam of the frame C, as shown in Figs. 1 and 2. The rear end of the rope *b* is fastened to a bail, *h*, which is pivoted to a rake-head, G, in advance of this head, as shown in Figs. 1, 2, and 3. The rake-head has a handle, *j*, secured to and projecting from its rear side, which is grasped and held by the attendant during the operation of gathering a load upon the teeth *k*. The teeth of the rake are bent, about as represented in Figs. 1 and 3, so that they will slide freely over the surface of the ground and gather the hay upon them, and the attendant of the rake is required to keep these teeth down upon the ground, and to prevent the rake from tilting forward and losing its load should the points of the teeth meet with obstructions in their path.

The length of the rake may be greater than the width of the wagon. We prefer, however, to gather a swath, when the grass is scattered upon the field, which is not quite as wide as the width of the wagon.

It is important, in the construction of the rake, that its bail be pivoted or otherwise attached to the rake-head or its tines, in such manner that when the rake is suspended by the rope *b* and hangs free it will not be liable to lose its load by tilting forward. If the rake is not constructed in this manner the attendant behind the machine must prevent it from tilting by attaching a rope to its handle and using this rope to steady the rake while it is being elevated over the wagon.

The slide-beams of the swinging frame C are supported by the extremities of a beam, S, of the wagon-frame, as shown in Figs. 1 and 2, during the act of gathering a load. This brings the free end of said frame near the surface of the ground, and also near the rake, which is upon the ground. It consequently serves in a great measure to support the rake as the wagon is moved forward.

The method of loading a wagon with the above-described contrivance is as follows: The forward horse or "leader" is hitched to the rope b, which may be carried along the tongue D, and when the rake has gathered a proper load the horse is unhitched from the draft pole or tongue and hitched to this rope b and then moved off until the load has reached the proper point for discharge. It is then discharged upon the wagon and the rake drawn back to gather another load, the horse being again hitched to the tongue. The frame C does not begin to swing upward and forward until the rake-bail is brought in contact with it.

By thus combining with a wagon a rake which is adapted for gathering hay from the surface of the ground and then serving to confine the load while it is being elevated upon the wagon, we are enabled to dispense with endless belts of rakes or vibrating forks, which have been applied to wagons before our invention for the purpose of loading them with hay. Our rake is controlled by the attendant, who follows behind the machine and directs the elevation of the load at the proper time, and who prevents the teeth of the rake from being bent or broken or the rake from upsetting.

When it is desired to load a wagon from a hay-stack the brake is detached and a fork is used in its stead. In this case the wagon is not drawn about, unless it be from one cock to another, and the horse for elevating the fork is not unhitched from the rope b until the wagon is properly loaded.

The swinging frame C guides the load from the rear end of the wagon and enables one to drop the load directly in the center of the wagon, either at its extreme rear end or at its extreme front end, or at any intermediate point between these ends.

We do not desire to confine our invention to a rake which is constructed precisely as we have described, nor to carrying the rope b along the tongue of the wagon, as described, as a variety of hand-rakes may be used with the swinging frame C for gathering the cut product and elevating it above the wagon and discharging it thereon. The forward end of the rope b may be carried off at right angles to the tongue either when a rake or a fork is used. Nor do we claim, broadly, the combination of a rake or a fork with a wagon having an elevating apparatus applied to it, as this combination was made before our invention, a swinging crane-arm having been used with a fork for loading the wagon to which the crane is applied.

Forks have been applied to wagons so as to gather and throw the gathered load upon the wagon, and endless bands of teeth have been used for gathering and discharging the load upon the wagon as it is drawn over the field, all of which contrivances are more or less objectionable on account of their complexity and expense, but chiefly for the reason that they do not deliver the gathered load in the center of the wagon and at any desired point from front to rear thereof.

In our experiments we have put on a load by letting the leader horse draw, the rake being attached to the rope constantly; but we find that the following is the best plan, to wit: a knot tied in the rope b just before the pulley e at the hounds, after the rake has been placed on the ground in its proper position; then the wagon moving along draws the rake until loaded, when the leader horse moves forward and raises the load.

We are aware that a swinging rake has been combined with a hay-wagon for the purposes of raking up the hay from the field and getting it upon the wagon at the one operation; but we are not aware that a rake-head has been moved by a cord or chain upon a swinging frame in such manner that a portion of its movement is independent of said frame, and the remainder of its movement along with the frame. Nor are we aware that a swinging rake has been so applied to a wagon that it could be moved centrally over the wagon from one end to the other.

What we claim as our invention, and desire to secure by Letters Patent, is—

1. The manner, substantially as herein set forth, of working the rake independently of the swinging frame, and then working both the rake and swinging frame together, for the purpose set forth.

2. So applying the rake to a wagon and controlling its operation that the hay may be raked and lifted from the ground and carried from one end of the wagon to the other, or to any point between the two ends of the wagon, substantially as herein described.

3. The arrangement of the several parts, substantially as described, whereby the rake and swinging frame are operated by the direct pull of the horse or horses attached to the wagon.

DE WITT C. JEWETT.
ASA C. BOWEN.

Witnesses:
B. C. HOPKINS,
WM. R. RICHARDSON.